March 28, 1933.　　　G. H. ACKER　　　1,902,934
GEAR CASING
Filed Aug. 27, 1931　　　3 Sheets-Sheet 2
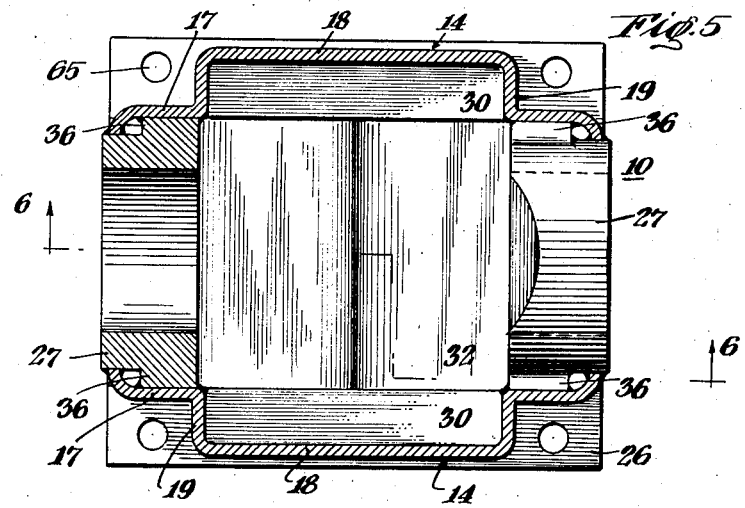
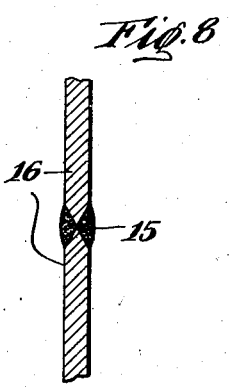
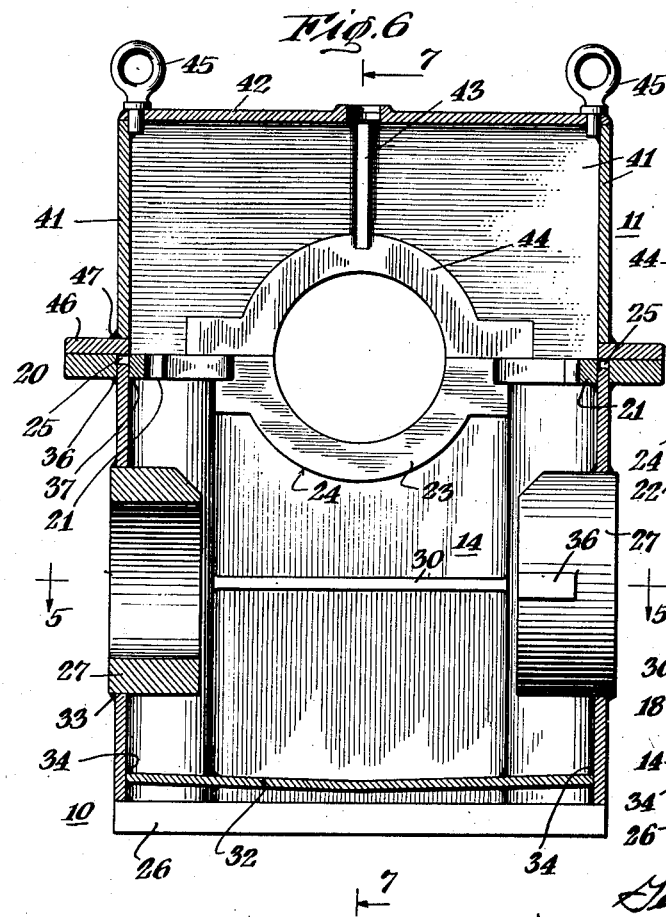
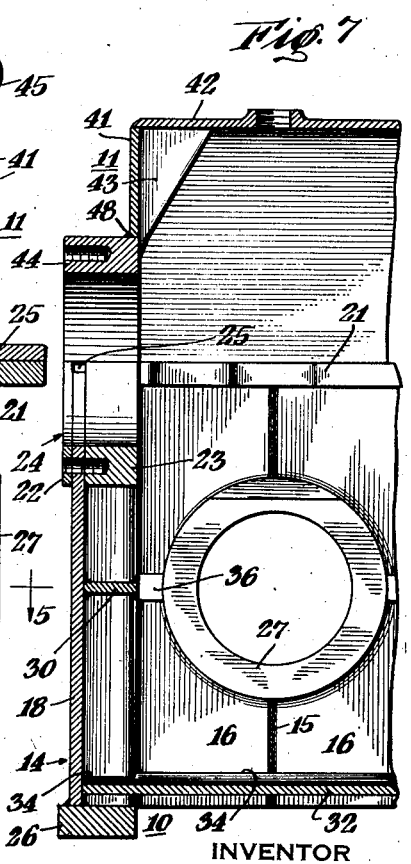
INVENTOR
George H. Acker
BY his ATTORNEYS

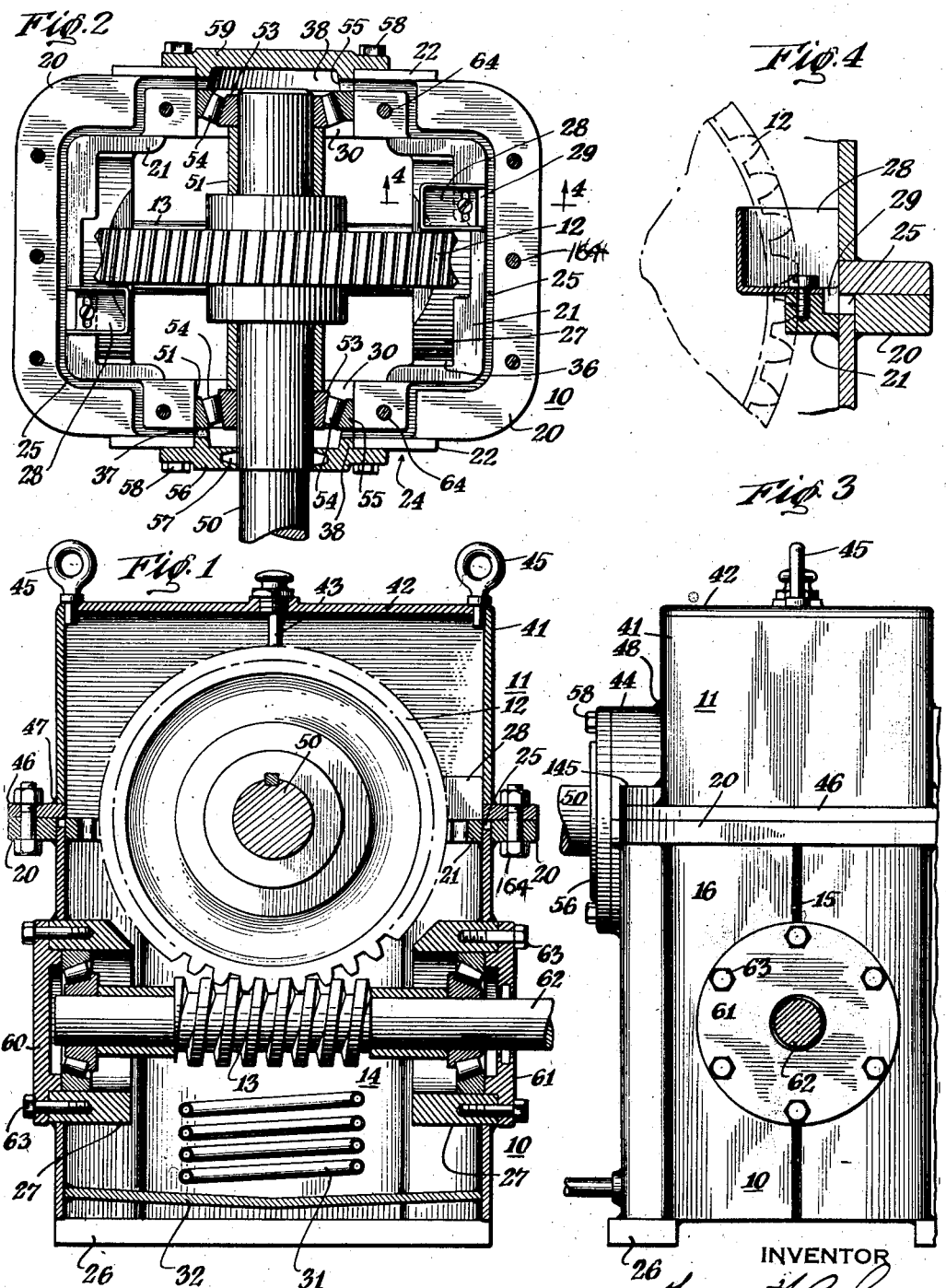

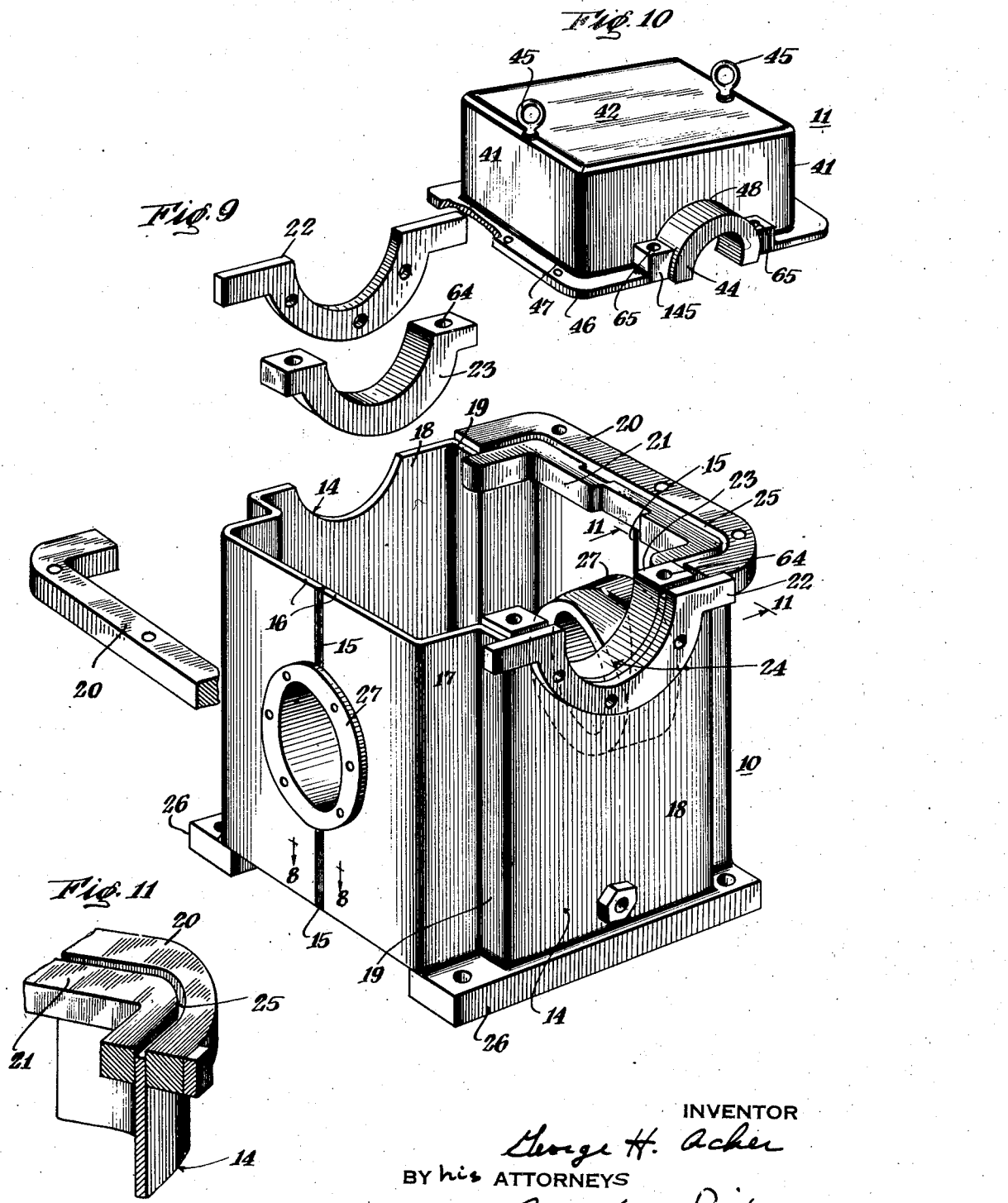

Patented Mar. 28, 1933

1,902,934

UNITED STATES PATENT OFFICE

GEORGE H. ACKER, OF CLEVELAND, OHIO, ASSIGNOR TO THE CLEVELAND WORM AND GEAR COMPANY, OF CLEVELAND, OHIO, A CORPORATION OF OHIO

GEAR CASING

Application filed August 27, 1931. Serial No. 559,636.

The invention relates to welded casings for machinery and the like.

According to the invention, the casing for a worm gear reduction unit or other machinery or the like is made up of sheet material fastened together principally by welding. The casing may comprise a body and a removable cap. Both the cap and body may be assembled by welding the several walls thereof together.

According to one form which the invention may take, the body may have its side walls made up of a plurality of U-shaped members welded together. Opposite side walls may be provided with offset portions to provide strengthening ribs. The upper edges of the body may be provided with inner and outer flanges welded thereto, preferably above the upper edges of the side walls to provide an oil groove for lubricating the worm wheel or other moving part. The bottom may be suitably welded within the side walls and suitable base lugs or bars may be welded to the bottom of the body by means of which the unit is secured to a suitable support.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 represents a vertical section through a worm gear reduction unit having a casing made according to the invention;

Fig. 2 is a plan view of the body with the cover of the casing removed;

Fig. 3 is a side elevation of the unit;

Fig. 4 is a detail taken on the line 4—4 of Fig. 2;

Fig. 5 is a section on the line 5—5 of Fig. 6;

Fig. 6 is a section on the line 6—6 of Fig. 5;

Fig. 7 is a section on the line 7—7 of Fig. 6;

Fig. 8 is a detail illustrating one manner of welding;

Fig. 9 is a partially exploded and perspective illustrating the construction of the body;

Fig. 10 is a perspective of the cover; and

Fig. 11 is a detail illustrating the formation of the oil groove.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and more particularly to Figs. 1 and 2, the worm gear reduction unit comprises in general the body 10, a removable cover or cap 11, a worm wheel 12 and a worm 13 in mesh therewith, both of which are journalled in the casing.

Referring now also to the other figures, the body 10 of the casing is made up of a pair of U-shaped members 14 having their ends welded together by seams 15. The U-shaped members are so constructed as to form the opposite side walls 16, end walls 17, offset end walls 18 and strengthening ribs 19. It will be understood that if desired instead of making this part of the casing form two U-shaped members, a single member may be used bent to the shape shown and welded to form a complete ring by a single seam.

Welded to the outer surface of the body are flanges 20 and to the inner surface of the body are welded flanges 21 of the shape shown. Also welded to the body are flange plates 22 and bearing yokes 23, both being curved to fit a cut-out portion in the offset end walls 18 and forming bearing recesses, indicated generally by 24. The flanges 20 and 21 and also the members 22 and 23 preferably extend a short distance above the upper edge of the side walls to form oil grooves, indicated by 25, as illustrated especially in Fig. 11.

Welded to the lower edges of the side walls are base bars 26 by which the unit is secured by holding down bolts (not shown) or the like to a suitable support. It will be noted that the holding down bars 26 are in direct contact with the reinforcing flanges or parts 19.

To provide a bearing for the worm 13, bearing sleeves 27 having lugs 36 are secured within suitable openings in the side walls 16 and welded in the position, as shown. Braces or flanges 30 are provided, extending between the flanges 19 to further strengthen the body. A bottom wall 32 sloping toward the center, is suitably welded within the upstanding walls of the body around the edge of the bottom wall, as indicated at 34.

If desired, a cooling coil, indicated by 31, may be placed at the bottom of the body submerged in the lubricant and through which a cooling medium, such as water, is circulated to help dissipate the heat generated by the moving parts. The coil 31 may be mounted in any desired manner. For feeding the oil grooves 25 with lubricant catch cups 28 may be provided disposed on diagrammatically opposite sides of the worm wheel 12 and on opposite side faces thereof to catch the lubricant dropping from the teeth of the worm wheel and to feed the same to the oil grooves 25, whence the oil is fed to the bearings mounted within the bearing spaces 24. Catch cups 28 are provided with a cut-out portion 29 communicating with the oil grooves 25 and they are adjustably mounted so as to adjust for clearance with the worm wheel 12.

Referring now to the cap or cover 11, this is made up of a plurality of side walls, indicated by 41, suitably welded together. The side walls 41 may be in one piece and welded at a single seam to form a complete ring, or the side walls may be formed in two or more sections welded together. For instance, each side wall may be formed separately or the side walls may be formed of U-shaped members welded together in the same manner as described above in connection with the body 10. The top wall 42 is welded to the side walls 41 and lifting eye bolts 45 are preferable welded to the top wall 42, as indicated in Fig. 6. If desired, suitable reinforcing braces 43 may be welded at the positions shown.

To provide a housing for the worm wheel bearings curved members 44 having lugs 145 integral therewith are welded to the side walls 41 at seams 48, as shown. Also flanges 46 are welded to the bottoms of the side walls by seams 47, as indicated, the flanges 46 and the curved member 44 extending to the inner surface of the side walls 41.

For clamping the cover 11 to the body 10, holes 65 are placed in the lugs 45 and holes 64 are tapped in the yokes 23. Clamping bolts (not shown) pass through the hole 65 and are screw-threaded through the hole 64 to securely clamp the cover to the body to prevent the loss of lubricant and ingress of dirt. Other clamping bolts provided with nuts, indicated generally by 164, pass through flanges 46 and 20 as shown.

For mounting the worm gear 12, a shaft 50 is journalled within roller bearings made of inner races 53, rollers 54 and outer races 55. Spacing sleeves 51 are disposed between the worm wheel 12 and the inner races 53. Caps 56 and 59 are secured to the flanges 22 and curved members 44 by suitable bolts 58. Cover plate 59 is completely closed and cover plate 56 is provided with an oil groove 57 for catching oil which may leak along the shaft 50. Shaft 50 is provided with an external power transmitting device such as an overhanging gear (not shown).

For mounting the worm 13 a similar construction is used, including closed cap 60 and open cap 61 which are secured to the bearing rings 27 by suitable bolts 63. The worm 13 is mounted upon a shaft 62 which is driven from any suitable source for power.

It will be understood that most of the parts above described, particularly those forming the walls of the casing, are made from sheet material suitably bent to shape and welded at the points indicated by any approved form of welding, such as indicated, for instance, in Fig. 8 where the welded seams extend from both sides of the sheets.

Although any form of lubrication may be used with the welded construction according to the invention, the above described lubricating principle is particularly useful with this particular form of casing. The principle is described at length in copending application Serial No. 435,773, filed March 14, 1930.

It will be noted that the teeth on the worm wheel 12 extend at an angle to the axis of revolution of the gear and incline toward one side face of the gear when moving from a lower to an upper position and inclined to another side face of the gear when moving from an upper to a lower position. The catch cups 28 are preferably spaced from the gear 12 so that they cannot touch it. This clearance may be quite small and just sufficient to allow for a slight bending of the gear under load. With this clearance when the oil is cold it may be thick enough on the side faces of the gear to touch the cups. When an operating temperature is reached the oil may be rather well thinned out and the coating on the faces of the worm gear may be too small to reach the cups.

The oil level in the bottom of the body is preferably sufficiently high to coat the teeth of the worm wheel 12 well with oil, when they mesh the worm 13. As the teeth on the worm wheel 12 travel upwardly, the oil may run to the lower sides and drops of oil may fall off the teeth and be caught by the catch cup 28 directly thereunder. As the teeth reach their uppermost position, the remaining oil on them collects in the hollow formed at the roots of the gear teeth, and when the teeth move downwardly, this oil runs off in the direction of the slope of the teeth and is wiped off or caught by the other catch cup.

The oil from the catch cups runs into the oil grooves 25 whence it runs into the bearings 24. It will be noted that slots 37 are cut in the flanges 38 of the caps 56 and 59 to allow oil to run from the grooves into the bearings.

The advantages of a welded construction are reduced weight, lower cost, greater strength, better heat radiation and also better appearance. The increased heat radiation is important since the allowable load upon worm gear reduction units depends somewhat upon the operating temperatures reached. The welded construction lends itself very well to the problem of lubrication and is of such shape that there are no dead spaces which would interfere with the proper radiation of the heat. Furthermore, the above advantages are accomplished without sacrificing strength. The walls of the casing are so shaped and ribbed as to provide maximum strength.

While certain novel features of the invention have been disclosed and are pointed out in the annexed claims, it will be understood that various omissions, substitutions and changes may be made by those skilled in the art without departing from the spirit of the invention.

What is claimed is:

1. In a casing for gearing, side and end walls, inner and outer members welded to said side walls and extending slightly above the upper edge thereof and forming an oil groove therewith, bearing pieces welded to said end walls and connecting with said groove, and means for supplying oil to said groove.

2. In a casing for a worm gear reduction unit, a sheet metal wall, inner and outer members welded thereto and forming an oil groove therewith, a bearing on said casing, and means for lubricating said bearing through said oil groove.

3. In a casing for gearing, a pair of U-shaped members having their free ends welded together, said welded free ends forming the side walls of the casing, the closed ends of said members forming the end walls of the casing, said end walls having outwardly extending offset portions connected by strengthening flanges, bearing members welded to said offset portions, and base bars welded to the lower ends of said offset portion and strengthening flanges.

4. In a casing for gearing, a pair of U-shaped members having their free ends welded together, said welded free ends forming the side walls of the casing, the closed ends of said members forming the end wall of the casing, said end walls having offset portions connected by strengthening flanges, and bearing members welded to said offset portions.

5. In a casing for a worm gear reduction unit, a pair of U-shaped members having their free ends welded together and forming the side walls of the casing, certain of said walls having offset portions connected by strengthening flanges, and bearing members secured to said offset portions.

6. In a casing for a worm gear reduction unit, a body comprising a pair of U-shaped members having their projecting ends welded together, the welded projecting ends forming the side walls of the body and the closed ends forming the end walls of the body, said end walls being provided with offset portions connected by strengthening flanges, outer and inner flanges welded to said side walls and adjacent part of the end walls above the upper edges of said walls to form oil grooves, outer and inner curved members welded to said offset end walls to provide bearing spaces and to provide cooperating oil grooves connecting with said first oil grooves, base bars welded to the lower ends of said U-shaped members across said end walls, offset portions and strengthening flanges, and additional strengthening ribs extending between said strengthening flanges and welded thereto.

7. In a casing for a worm gear reduction unit, a body comprising a pair of U-shaped members having their projecting ends welded together, the welded projecting ends forming the side walls of the body and the closed ends forming the end walls of the body, said end walls being provided with offset portions connected by strengthening flanges, outer and inner flanges welded to said side walls and adjacent part of the end walls above the upper edges of said walls to form oil grooves, and outer and inner curved members welded to said offset end walls to provide bearing spaces and to provide additional oil grooves connecting with said first oil grooves.

8. In a casing for gearing, a body comprising a pair of U-shaped members having their free ends welded together to form side and end walls for the casing, certain of said walls being provided with offset portions connected by strengthening flanges, outer and inner flanges secured to other of said side walls and extending above the upper edges thereof to form oil grooves, bearing members secured to said offset walls, said bearing members connecting with said oil grooves.

In testimony whereof I have hereunto set my hand.

GEORGE H. ACKER.